US007609904B2

(12) United States Patent
Miller

(10) Patent No.: US 7,609,904 B2
(45) Date of Patent: Oct. 27, 2009

(54) TRANSFORM CODING SYSTEM AND METHOD

(75) Inventor: Matthew L. Miller, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1032 days.

(21) Appl. No.: 11/093,568

(22) Filed: Mar. 30, 2005

(65) Prior Publication Data

US 2006/0155531 A1 Jul. 13, 2006

Related U.S. Application Data

(60) Provisional application No. 60/643,417, filed on Jan. 12, 2005.

(51) Int. Cl.
*G06K 9/00* (2006.01)
*G06K 9/36* (2006.01)
*G06K 9/46* (2006.01)
*G06F 15/00* (2006.01)
*G10L 11/00* (2006.01)

(52) U.S. Cl. ....................... 382/251; 382/232; 382/246; 704/200

(58) Field of Classification Search ................. 382/251, 382/232, 246; 704/200
See application file for complete search history.

(56) References Cited

U.S. PATENT DOCUMENTS 5,285,498 A 2/1994 Johnston
5,924,060 A 7/1999 Brandenburg
5,930,398 A * 7/1999 Watney ...................... 382/239
6,064,958 A * 5/2000 Takahashi et al. ........... 704/243

OTHER PUBLICATIONS

Tran, T.—"A locally adaptive perceptual masking threshold model for image coding"—IEEE—1996, pp. 1882-1885.*
Miller, M.—"Greedy perceptual coding"—IEEE—Dec. 2005, pp. 890-894.*
Johnston, James D., "Transform Coding of Audio Signals Using Perceptual Noise Criteria", IEEE Journal on Selected Areas in Communications, vol. 6, No. 2, Feb. 1988.
Jayant, Nikil et al., "Signal Compression Based on Models of Human Perception", Proceedings of the IEEE, vol. 81, No. 10, Oct. 1993.
Vitter, Jeffrey S., "Design and Analysis of Dynamic Huffman Codes", Journal of the Association for Computing Machinery, vol. 34, No. 4, Oct. 1987.
Huffman, David A., "A Method for the Construction of Minimum-Redundancy Codes", Proceedings of the IRE, pp. 1092-1102, Sep. 1952.
ITU-T Rec. T.81, "Digital Compression and Coding of Continous-Tone Still Images-Requirements and Guidelines", International Telecommunication Union, CCITT, Sep. 1992.
ISO/IEC 15444-1:2000, "JPEG2000 Part 1: Image Coding System", Final Committee Draft Version 1.0, Mar. 2000.
ISO/IEC 15444-2:2000, "JPEG2000 Part 2: Extensions", Final Committee Draft, Dec. 2000.

* cited by examiner

*Primary Examiner*—Bhavesh M Mehta
*Assistant Examiner*—Bernard Krasnic
(74) *Attorney, Agent, or Firm*—James Bisetto

(57) ABSTRACT

A transform coding system and method are disclosed which utilize a modified quantization technique which advantageously foregoes the need for inverse quantization at the decoder. New techniques for optimizing an entropy code for the modified quantizer and for constructing the entropy codes are also disclosed.

26 Claims, 13 Drawing Sheets

(A)

(B)

TRANSFORM CODING SYSTEM AND METHOD

This application claims the benefit of U.S. Provisional Application No. 60/643,417, entitled "TRANSFORM CODING SYSTEM AND METHOD," filed on Jan. 12, 2005, the contents of which are incorporated by reference herein.

BACKGROUND OF THE INVENTION

The present invention is related to processing of signals and, more particularly, to encoding and decoding of signals such as digital visual or auditory data.

Perceptual coding is a known technique for reducing the bit rate of a digital signal by utilizing an advantageous model of the destination, e.g., by specifying the removal of portions of the signal that are unlikely to be perceived by a human user. FIG. 1 illustrates the basic structure of a transform coding system. Applying perceptual coding to such a system typically amounts to applying different levels of distortion to different transform coefficients, according to the impact those coefficients have on human perception. More distortion can be applied to less-perceptible coefficients, while less distortion must be applied to more-perceptible coefficients. A fundamental problem with applying an arbitrary perceptual model to such a system is that most lossy compression schemes rely on the decoder having knowledge of how the source data was distorted. This is usually necessary for the inverse quantization step (set forth as 150 in FIG. 1), in which values decoded 140 from the entropy code are scaled according to the quantization 120 applied during compression. If the encoder is to apply a sophisticated perceptual model to determine how to quantize each coefficient the decoder must somehow obtain or recompute the resulting quantization intervals to perform inverse quantization.

The simplest approach to addressing this issue is to use predefined quantization intervals, based on a priori information known about the coefficients, such as the frequencies and orientations of the corresponding basis functions. The quantization of a coefficient, accordingly, depends only on the position of that coefficient in the transform and is independent of the surrounding context. See, e.g., ITU-T Rec. T.81, "Digital Compression and Coding of Continuous-Tone Still Images—Requirements and Guidelines," International Telecommunication Union, CCITT (September 1992) (IPEG standard, ISO/IEC 10918-1). Although this approach is very efficient, it is very limited and cannot take advantage of any perceptual phenomena beyond those that are separated out by the transform 110. A more powerful approach is to define a perceptual model that can be applied in the decoder during decompression. During compression, the encoder dynamically computes a quantization interval for each coefficient based on information that will be available during decoding; the decoder uses the same model to recompute the quantization interval for each coefficient based on the values of the coefficients decoded so far. See, e.g., ISO/IEC 15444-1:2000, "JPEG2000 Part I: Image Coding System," Final Committee Draft Version 1.0 (Mar. 16, 2000) (JPEG2000 standard); ISO/IEC JTC 15444-2:2000, "IPEG2000 Part II: Extensions," Final Committee Draft, (Dec. 7, 2000) (point-wise extended masking extension). While a well-designed system using such recomputed quantization can yield dramatic improvements over predefined quantization, it is still limited in that the perceptual model utilized cannot involve any information lost during quantization, and the quantization of a coefficient cannot depend on any information that is transmitted after that coefficient in the bitstream. The most flexible approach in the prior art is to include some additional side information in the coded bitstream, thereby giving the decoder some hints about how the coefficient values were quantized. Unfortunately, side-information adds bits into the bitstream and, thus, lowers the compression ratio.

Accordingly, there is a need for a new approach that can fully exploit perceptual modeling techniques while avoiding the need for side information.

SUMMARY OF THE INVENTION

An encoding system and method are disclosed which utilize a modified quantization approach which advantageously foregoes the need for inverse quantization at the decoder. A plurality of coefficients is obtained from an input signal, e.g., by a transformation or from sampling, and, for each coefficient, a range of quantized values is determined that will not produce unacceptable perceptual distortion, preferably in accordance with an arbitrary perceptual model. This range of values is referred to herein as the "perceptual slack" for the coefficient. A search is then conducted for code values based on a selected entropy code that lie within the perceptual slack for each of the coefficient values. A sequence of code values is selected which minimizes the number of bits emitted by the entropy code. The modified quantizer thereby maps the coefficient values into a sequence of code values that can be encoded in such a way that the resulting perceptual distortion is within some prescribed limit and such that the resulting entropy-coded bit sequence is as short as possible. The perceptual model is advantageously not directly involved in the entropy code and, thus, it is unnecessary to limit the perceptual model to processes that can be recomputed during decoding.

In accordance with another aspect of the invention, an embodiment is disclosed in which the entropy code utilized with the modified quantizer can be optimized for a corpus of data. The corpus is utilized to obtain coefficient values and their respective perceptual slack ranges as determined by the perceptual model. At a first iteration, the code value to which the most number of coefficients can be quantized to is identified; all coefficients whose ranges overlap with this code value are removed from the corpus. The probability of this value in the probability distribution is set to the frequency with which coefficients can be quantized to it. On the next iteration, the second-most common value in the quantized data is recorded, and so on, until the corpus is empty. The resulting probability distribution can be utilized to construct the entropy codes, as well as guide the modified quantization.

In accordance with another aspect of the invention, a new technique for constructing codes for the entropy coder is disclosed. A conventional Huffman code is constructed for the strings in the code list. If the extra bits required to code each string exceeds a threshold, then a selection of strings in the code list is replaced by longer strings. Another set of Huffman codes is constructed and the processing iterated until the extra bits do not exceed the threshold. A number of heuristics can be utilized for selecting the strings to replace, including selecting the string with the highest probability, selecting the string that is currently encoded most inefficiently, or selecting the string with the most potential for reducing the extra bits.

The above techniques can be combined together and with a range of advanced perceptual modeling techniques to create a transform coding system of very high performance. These and other advantages of the invention will be apparent to those of ordinary skill in the art by reference to the following detailed description and the accompanying drawings.

DETAILED DESCRIPTION

Figure 1:
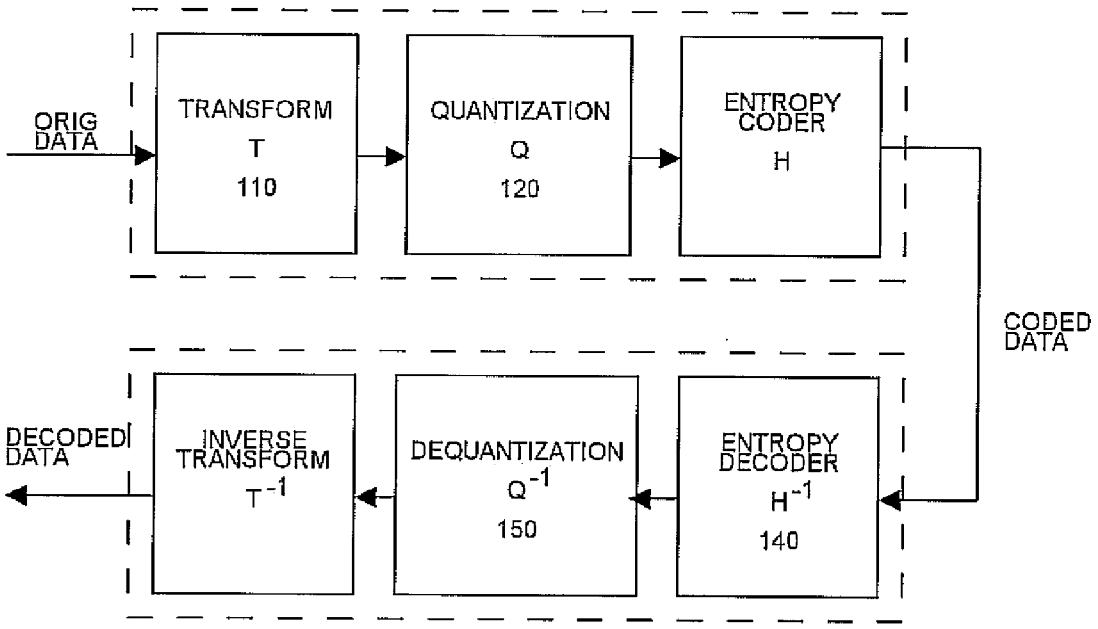
FIG. 1 (PRIOR ART)
FIG. 1 is an illustration of the structure of a basic prior art transform coding system.
Figure 2:
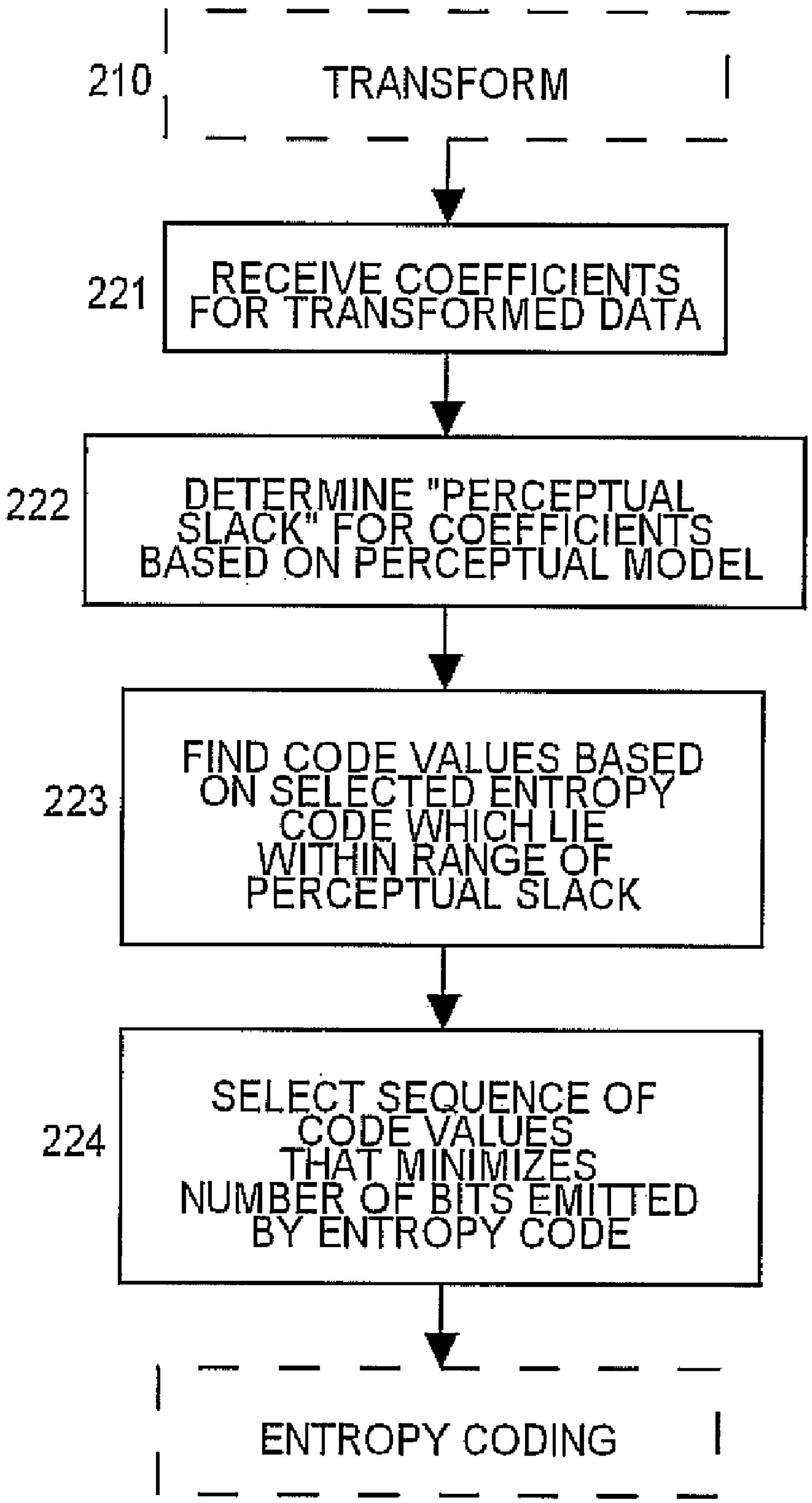
FIG. 2 is a flowchart of processing performed in encoding an input signal in accordance with an embodiment of an aspect of the invention.

FIG. 2 is a flowchart of processing performed to encode an input signal in accordance with an embodiment of an aspect of the invention. The input signal can be representative of, for example and without limitation, image, video, or audio data. At step 210, the input signal is transformed, e.g., by applying known transformation schemes, such as Discrete Cosine Transform (DCT), Wavelets, Fourier Transform, etc. At step 221, the coefficients for the transformed data are received.

In FIG. 2, these transform coefficients are then processed using a modified quantization approach. At step 222, for each coefficient in the transformed data, a range of values is determined that will not produce unacceptable perceptual distortion, in accordance with the selected perceptual model. This range of values is referred to herein as the "perceptual slack." The perceptual slack reflects the differences between the original coefficient value and either end of the corresponding range. This step, unlike arrangements in the prior art, can be performed using any arbitrary perceptual model. It is unnecessary to limit it to processes that can be recomputed during decoding, since the model used here will not be directly involved in the entropy code.

At step 223, a search is conducted for code values based on the selected entropy code that lie within the perceptual slack for each of the coefficient values. Then, at step 224, a sequence of code values is selected which minimizes the number of bits emitted by the entropy code. For example, consider the situation in which the entropy code is optimized for a sequence of independent and identically distributed (i.i.d.) coefficient values. Assume that the code will yield optimal results when each coefficient value is drawn independently from a stationary distribution P, such that P(x) is the probability that a coefficient will have value x. The entropy code being optimal for this distribution means that the average number of bits required for a given value, x, is just $-\log_2(P(x))$. Thus, for each coefficient, step 224 in FIG. 2 is accomplished by searching the range of acceptable values to find the one with the highest probability in the distribution assumed by the entropy code. That is, the selected value is given by $$x_q = \arg \max_{x=x_{min} \cdots x_{max}} P(x)$$

where $x_{min}$ and $x_{max}$ are the ends of the range of values allowable for that coefficient and $X_q$ is the selected value.

Figure 3:
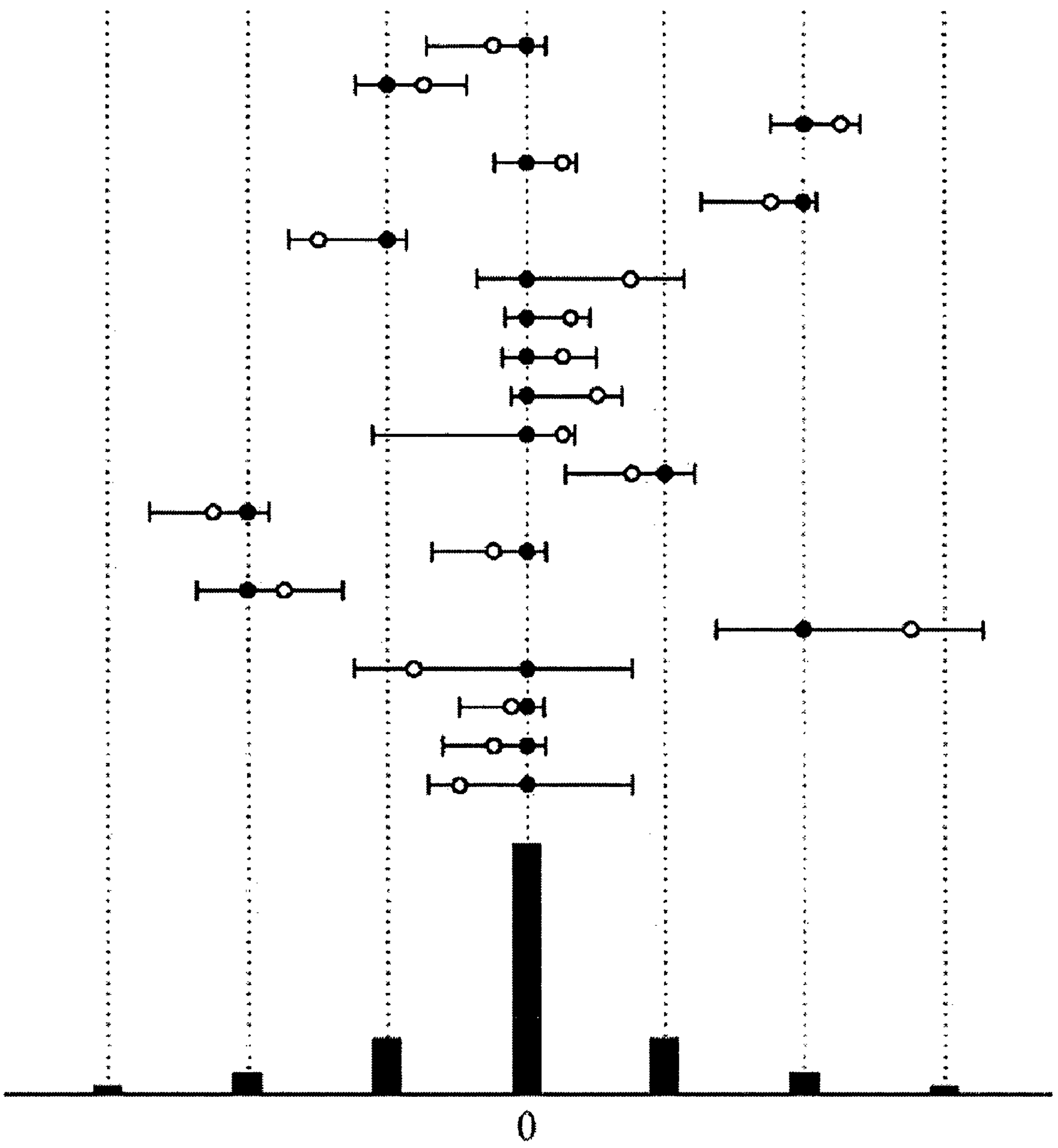
FIG. 3 is an illustration of code selection in accordance with the modified quantization approach shown in FIG. 2.

FIG. 3 shows a simple example. Each vertical dashed line in FIG. 3 represents a value that can be encoded in the entropy code. Values between these lines cannot be encoded with the selected entropy code. The bar graph at the bottom of FIG. 3 illustrates the probability distribution for which the entropy code is optimized. Values with longer bars are more probable and, hence, require fewer bits, while values with shorter bars require more bits. The probability distribution shown in FIG. 3 is typical for simple entropy codes, such as that used in JPEG, in that probabilities drop off monotonically with the magnitude of the coefficient value. The white circles indicate a sequence of original, unquantized coefficient values, ordered from top to bottom. The left-right error bars around each coefficient value indicates the perceptual slack, the range of acceptable values as determined by the perceptual model. Finally, the black circles show the values that result from the modified quantization described above in FIG. 2. Note that the coefficient values are rarely quantized to the nearest value representable in the code, but rather to the value within the range that has the highest probability.

It is helpful to contrast the approach illustrated above with prior art quantization. Using a conventional quantization approach, the arbitrary coefficient values would be replaced with discrete symbols by applying a real-valued function and rounding the real-valued results to the nearest integer. In other words, a quantization function Q(x) is typically defined as Q(x)=round(f(x)) where f(x) is the arbitrary real-valued function that defines the manner in which quantization is performed. As f(x) changes from coefficient to coefficient, in accordance with the specific perceptual coding strategy, the transform decoder needs to follow these changes. The prior art transform decoder accomplishes this by performing the process of "inverse quantization," namely by applying the inverse of f(x). This process of inverse quantization does not actually invert Q(x), since information is lost during rounding.

The transform coefficients are processed in FIG. 2, however, in a manner that advantageously foregoes the need for inverse quantization. In essence, this represents a different way to view quantization. Instead of viewing it as a process of representing real values with integers, it is viewed as a process of replacing arbitrary real values with nearby real values drawn from some discrete set. In a sense, Q(x) has been redefined as $Q(x)=f^{-1}(\text{round}(f(x)))$. Here, f(x) defines a discrete set of real values—the set of values, $x_i$, for which $f(x_i)$ is an integer—and the Q(x) function maps each x to a nearby $x_i$. The task of the prior art quantizer has been replaced by a modified quantizer which maps the arbitrary coefficient values into a sequence of values that can be encoded in such a way that (a) the resulting perceptual distortion is within some prescribed limit and (b) the resulting entropy-coded bit sequence is as short as possible. With this view of the operation, the task of the entropy coder is to merely encode some discrete set of possible values ($x_i$'s) and produce a specific number of bits for each sequence of those values. The entropy code becomes a straightforward lossless code and there is no need for "inverse quantization" in the decoder. In other words, the entropy code can now be treated as a "black box," thereby facilitating new strategies for quantization.

ENTROPY CODE DESIGN. Although the above-mentioned modified quantization can be utilized with any entropy encoder, nevertheless, it is preferable to select an entropy code that is optimized for use with the modified quantization approach. Assuming that the entropy codes are designed for i.i.d. coefficient values, this amounts to seeking the best probability distribution, P, for which to optimize the code. In the absence of any quantization, P(x) should simply be the frequency with which x appears in the transforms of a large corpus of sample data. When applying the above quantization approach, however, these frequencies will be changing. Moreover, the changes made will be dependent on P itself. What is preferable, then, is a P that matches the distribution resulting from the modified quantization, when that quantization is applied using P itself. This distribution preferably should have as low an entropy as can be managed, given the limits imposed by the perceptual model.

Figure 4:
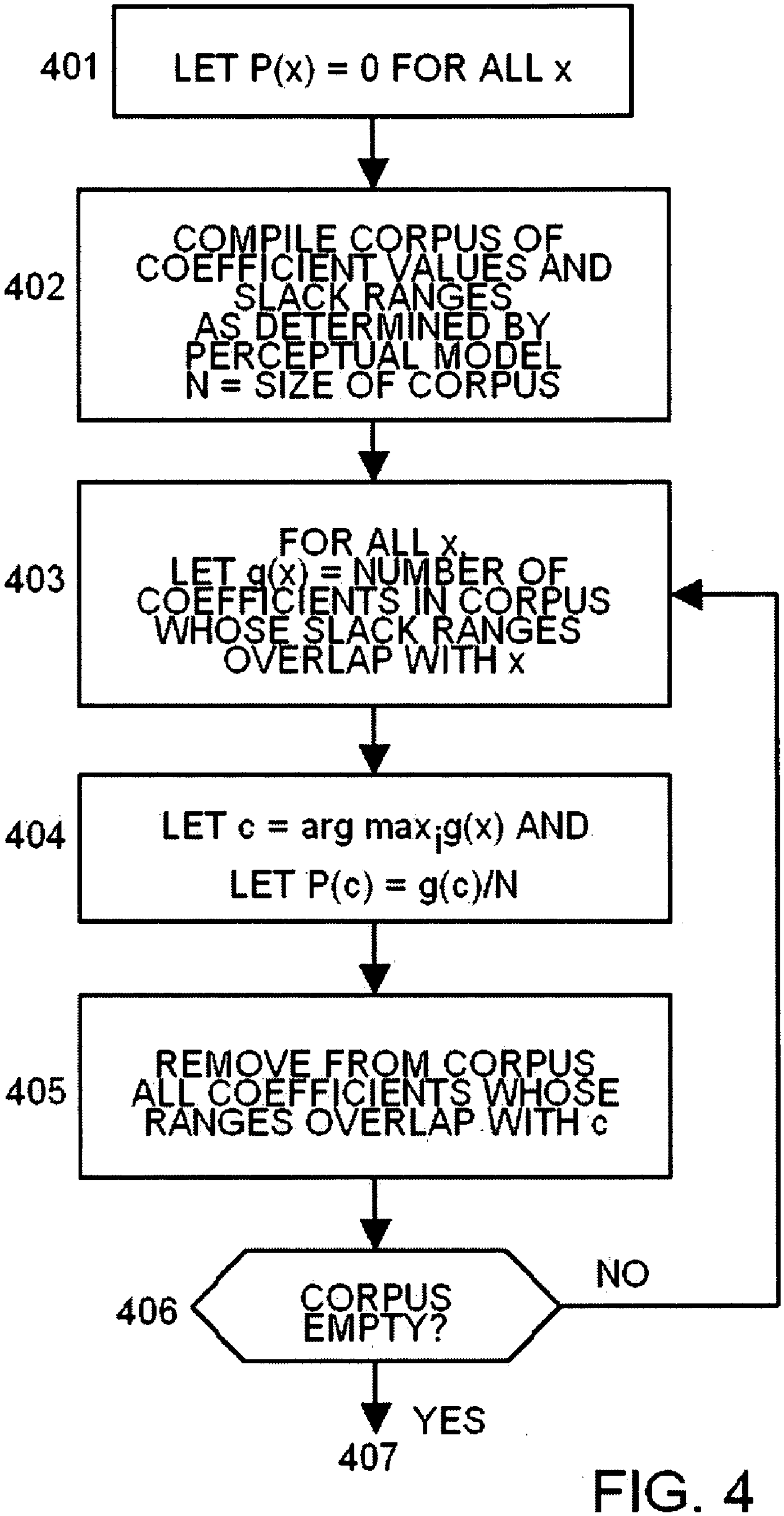
FIG. 4 is a flowchart of processing performed in approximating an optimal probability distribution for the entropy code, in accordance with an embodiment of another aspect of the invention.

FIG. 4 is a flowchart of processing performed in approximating this optimal probability distribution, in accordance with an embodiment of another aspect of the invention. At step 401, P(x) is set to 0 for all x. At step 402, a corpus of coefficient values is obtained, along with their respective slack ranges as determined by the perceptual model. This corpus preferably should be representative of the values that will be quantized. It may be drawn from a single work of media, if the code is to be tailored specifically for that work. Or it may be drawn from a large dataset, if a code is sought that is more generally applicable. Let N=the size of this corpus. At step 403, for all x, let g(x)=the number of coefficients in the corpus whose slack ranges overlap with x. This is a count of the number of coefficients that can be quantized to x. At step 404, let c=arg $\max_i$ g(x) and let P(c)=g(c)/N. At step 405, all the coefficients whose ranges overlap with c are removed from the corpus. N preferably should not change and should always reflect the original size of the corpus. At step 406, if the corpus is not empty, processing loops back to step 403. Each iteration should fill in one entry in P. In the first iteration, what is found is the single value, c, that the most coefficients can be quantized to. The probability of this value in P is set to the frequency with which coefficients can be quantized to it. This is precisely the frequency with which coefficients will be quantized to it, because, as discussed below, this frequency will be higher than any other frequency in P when the processing has finished. Once the first iteration is complete, the coefficients that can be quantized to c are removed from the corpus. When the new values of g are computed in the second iteration, they cannot be higher than the values in the preceding iteration, and thus cannot be higher than the preceding value of g(c). The new c, found in step 404, will become the second-most common value in the quantized data. And so the processing progresses until P contains non-zero probabilities for values that overlap with all the slack ranges of coefficients in the original corpus.

Figure 5:
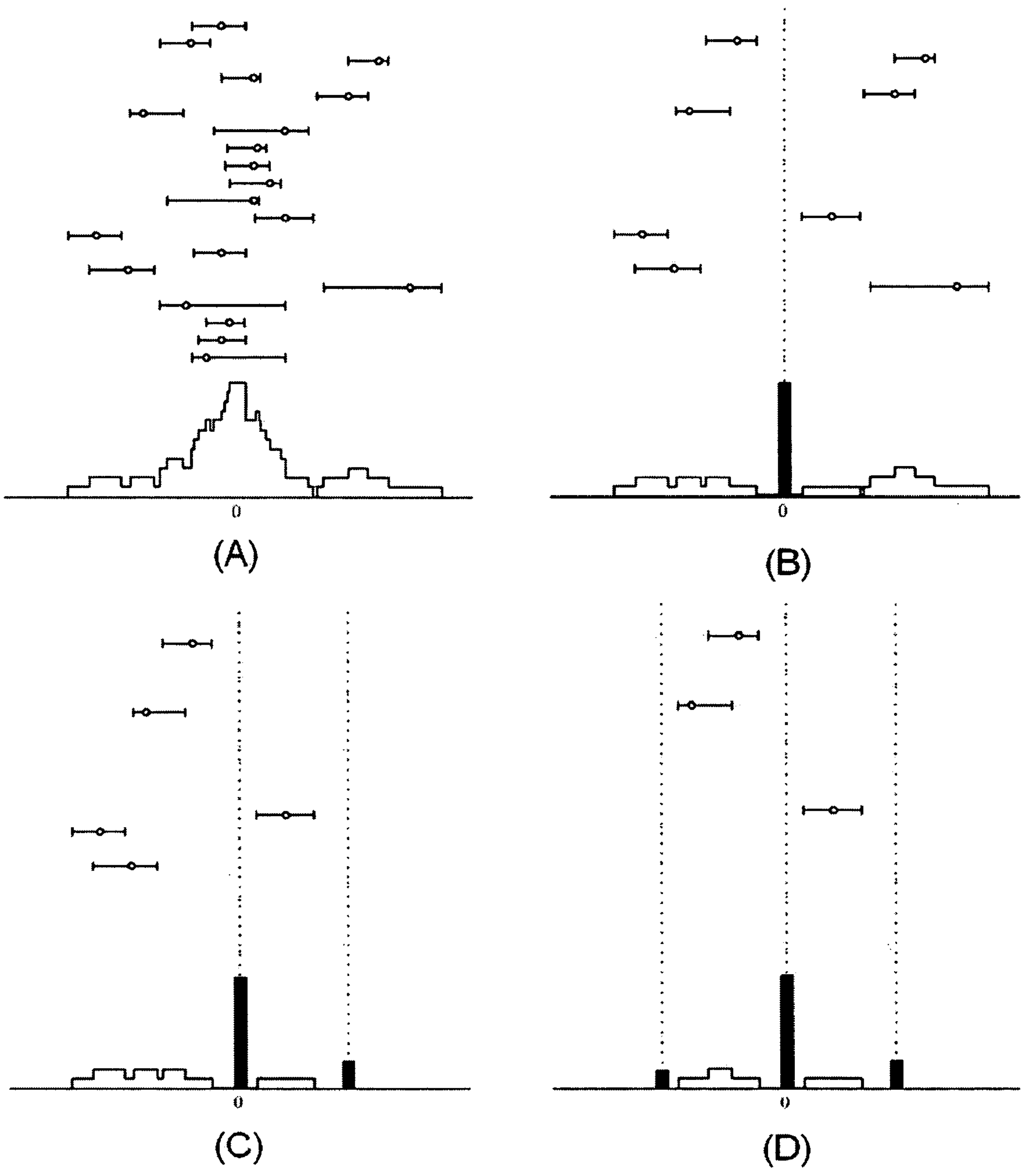
FIGS. 5A, B, C, and D illustrate processing iterations as shown in FIG. 4.
Figure 6:
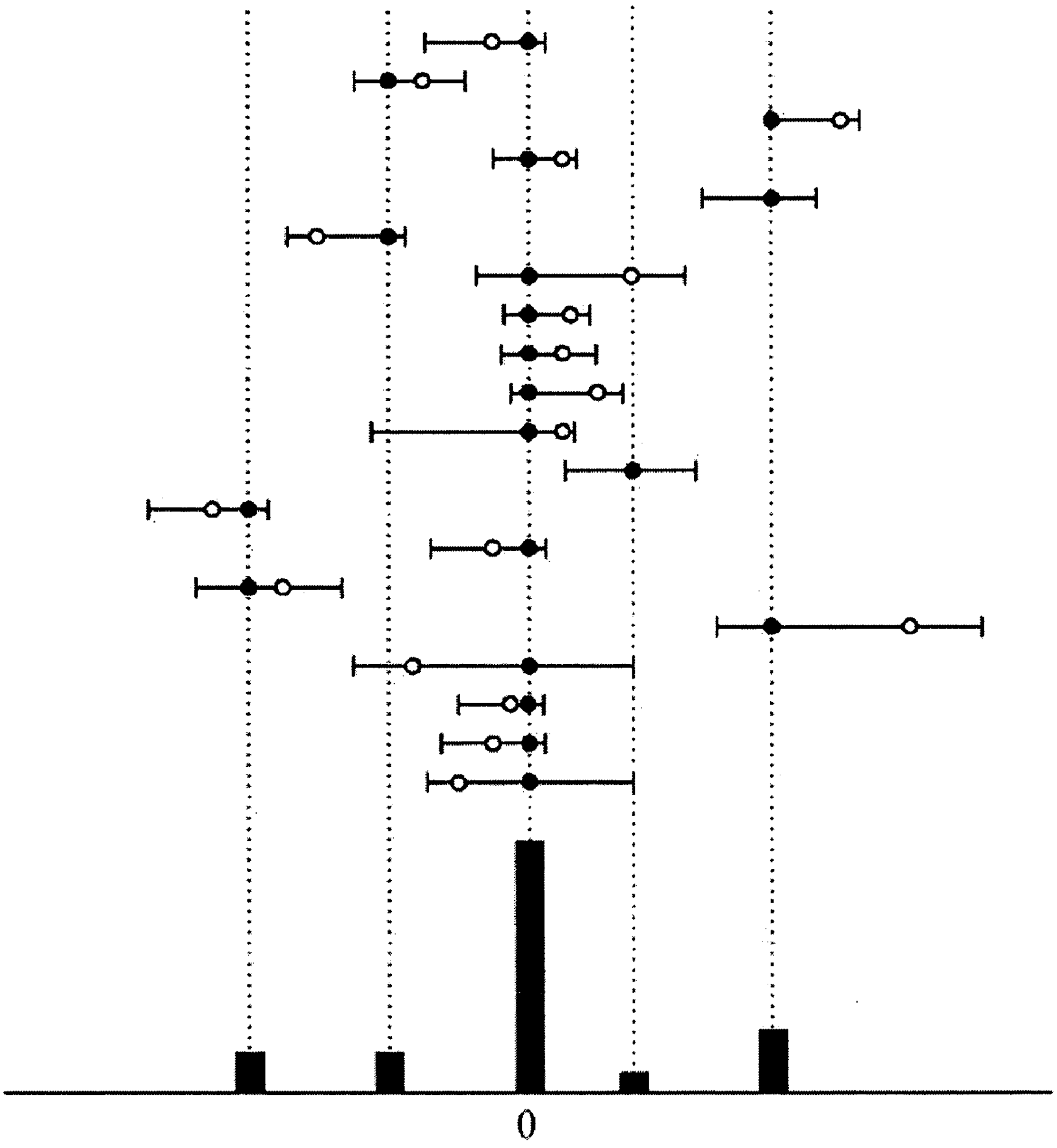
FIG. 6 is an illustration of code selection using the probability distribution generated after the processing illustrated in FIG. 5.

As an example, FIGS. 5A, B, C, and D illustrate, respectively, the first four iterations using the data shown in FIG. 3 as the corpus. The corpus at the beginning of each iteration is shown with open circles and error bars. The state of P at the beginning of each iteration is shown with a bar graph and dotted lines. Note that in the first iteration, P is all zeros, so there are no bars or dotted lines. The line graph at the bottom of each iteration's illustration shows that iteration's values for g(•). The final probability distribution obtained after a complete run is illustrated by FIG. 6. FIG. 6 also shows the effect of utilizing this probability distribution with the above modified quantization. Note how the code values selected in the processing of the transform coefficients in FIG. 6 differs from FIG. 3 due to the optimization in the probability distribution.

Figure 7:
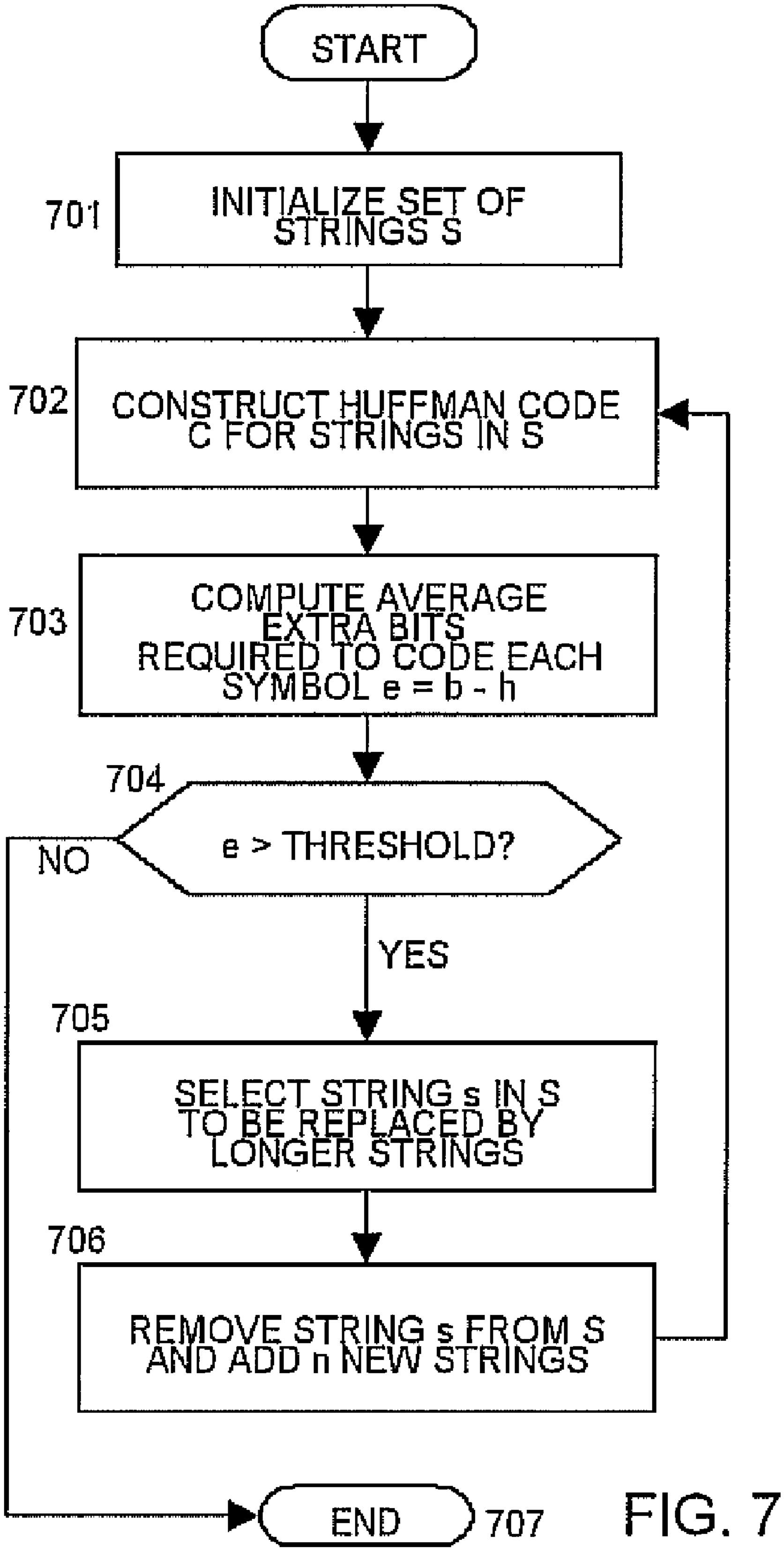
FIG. 7 is a flowchart of processing performed in constructing codes for the entropy encoder, in accordance with an embodiment of another aspect of the invention.

Code Construction. Once a probability distribution of code words is obtained, the code utilized by the entropy coder can be readily constructed using any of a number of known techniques. See, e.g., D. A. Huffman, "A Method for the Construction of Minimum-Redundancy Codes," Proceedings of the I.R.E., pp. 1098-1102 (September 1952); J. S. Vitter, "Design and Analysis of Dynamic Huffman Codes," Journal of the ACM, pp. 825-45 (October 1987). In accordance with an embodiment of another aspect of the invention, FIG. 7 illustrates a new technique for constructing what are known in the art as "Huffman" codes. It is assumed that each symbol in an alphabet of n symbols is drawn independently from a stationary probability distribution.

At step 701, a set of strings S is initialized to {'$s_1$', '$s_2$', . . . '$s_3$'}, where '$s_i$' is a string consisting of only symbol $s_i$. This is the set of strings represented by specific bit sequence. As the processing progresses, some of these strings will probably be replaced by longer strings. At step 702, a conventional Huffman code C(•) is constructed for the strings in S. Huffman's algorithm, and its variants, generate the best code that can be achieved using an integral number of bits to represent each string, but it is unlikely that this will be the most efficient code possible, because many symbols should be encoded with non-integral numbers of bits. The expected number of bits per symbol in a message encoded using C(•) is given by the following equation:

$$b = \frac{\sum_{S \in S} P(S)\, len\,(C(S))}{\sum_{S \in S} P(S)\, len\,(S)}.$$

P(S) is the probability that the next several symbols in the sequence will match string S. As the symbols are assumed to be i.i.d., this is equal to the product of the probabilities of the individual symbols in S. The expression len(•) gives the length of a string os symbols or a sequence of bits. C(S) is an encoding of string S with a sequence of bits. Thus, the expression b is just the ratio between the expected number of bits and the expected string length. The theoretical minimum number of bits per symbol is given by the entropy of the symbol distribution:

$$h = \sum_{s} P(s) \log_2(P(s)).$$

$P(s_i)$ is the probability that the next symbol in the sequence will be $s_i$. This is independent of previous symbols in the sequence.

Thus, at step 703 in FIG. 7, the number of extra bits required to code each symbol is given by the difference between the value of b and h, namely e=b−h. If e is less than or equal to a threshold t, then the processing can terminate. The code C(•) is within the threshold of the theoretical optimum and satisfactory. Otherwise, if e is greater than the threshold t, then at step 705 a string S in S is selected to be replaced by longer strings. At step 706, the string S is removed from S, and n new strings are added to S. An advantageous set of new strings would be concat(S, $s_1$), concat(S, $S_2$), . . . , concat(S, $s_n$), where concat(S, $s_i$) is the concatenation of string S with symbol $s_i$. The probability for each of these new strings is given by $$P(concat(S,s_i))=P(S)P(s_i).$$

Then, the processing continues back at step 702, with the construction of a new Huffman code for the strings in S.

With regard to the strategy for selecting the string S to be replaced in step 705, a variety of heuristics can be utilized. The better the strategy utilized, the smaller the code books should be. The simplest heuristic is to select the S that has the highest probability. This is intuitive, because it will tend toward a set of strings that all have similar probabilities. However, it might be that the most probable string is already perfectly coded, in which case replacing it with longer strings is unlikely to improve the performance of the code. Another strategy is to select the S that is currently encoded most inefficiently. That is, one can pick the S that maximizes $e_s$=len (C(S))−$\log_2$(P(S)). This typically works better than picking the most probable S, but it doesn't consider all of the characteristics of the string that effect the calculation of e above, which is the value that needs to change. The approach that appears to work the best is to select the S that has the most potential for reducing e. A determination is made of how much e will be reduced if, by replacing S with longer strings, the first len(S) symbols of those strings are caused to be perfectly encoded. This would mean that the numerator in the equation for b above would be reduced by P(S)$e_s$. At the same time, by replacing S with n strings that are one symbol longer, the denominator would be increased by P(S). Thus, it is desirable to seek the string that minimizes:

$$b = \frac{\sum_{S\in S} P(S)\,len\,(C\,(S)) - P(S)\,e_S}{\sum_{S\in S} P(S)\,len\,(S) + P(S)}.$$

It is useful to terminate 707 the processing in FIG. 7 if the code gets too large. For some values of t, the maximum allowable extra bits per symbol, and some probability distributions, no code with integer-length code words exists. In these cases, the above technique will never terminate. It may also not terminate because of its heuristic, non-optimal nature. In other eases, codes may exist, but the codebooks may be too large for practical use. Thus, after determining that e>t at step 704, it is advantageous to check the size of the codebook to see whether it can be possible to expand it. If not, the processing terminates early. Also, if termination occurs early as the processing iterates in FIG. 7, the resulting code may not be the best one already constructed. The efficiency of the codes it generates sometimes gets worse as a result of expanding a string. Overall, the general trend is toward increasingly efficient codes, but if termination occurs before reaching the efficiency indicated by t, one may end up with a code that is less efficient than a earlier one. This can be readily addressed by keeping track of the most efficient code found so far. In the middle of the processing in FIG. 7, a check can be conducted to see whether C(•) is better than the best code found so far. If it is, the code can be rep laced by C(•).

By encoding strings of symbols, rather than individual symbols, it is possible to encode some symbols with non-integral numbers of bits. This is particularly important when the probability of some symbols is larger than 0.5, because such symbols should be encoded with less than one bit, on average. This occurs with values of 0, which typically arise far more than half the time in practical applications. The technique above will produce the equivalent of run-length codes in such cases.

Parametric Codes. The above description of the entropy coder has focused on a limited form of entropy coding that utilizes fixed sets of predefined codebooks. While the above-mentioned modified quantization approach serves to map the distribution of values into one that is appropriate for the given code, even further improvements in matching the distribution of coefficient values in a given data set can be obtained by using more flexible forms of entropy coding. For example, the probability distribution for the entropy code could be described with a small set of parameters. The encoder could then choose parameters that provide the best match to an ideal distribution, as determined by the processing illustrated by FIG. 4, and compress with an arithmetic code for that distribution. The parameters could then be transmitted in the bit-stream so that the decoder could reconstruct the distribution and decode the coefficients.

Exploiting Mutual Information. The above description has also assumed that the entropy code is optimized for i.i.d. coefficient values. This means that the average number of bits required for a given value is independent of the values around it. If there is significant mutual information between coefficients, however, then the code should be context-dependent, meaning that the number of bits should depend on surrounding values. For example, if successive coefficient values are highly correlated, a given coefficient value should require fewer bits if it is similar to the preceding coefficient, and more bits if it is far from the preceding coefficient. The above modified quantization approach can be applied with a context-dependent entropy code. The context can be examined to determine the numbers of bits required to represent each possible new value of a coefficient. That is, the new value of a coefficient is given by $$x_q = \arg \min_{x=x_{min} \cdots x_{max}} B\,(x,\,C)$$

where $x_{min}$ and $x_{max}$ describe the slack range for the coefficient, C is a neighborhood of coefficient values that effect the coding of the current coefficient, and B(x,C) gives the number of bits required to encode value x in context C (infinity if the code cannot encode x in that context). The improvement obtained using context-dependent coding may be dramatic, because there is substantial mutual information between coefficient slack-ranges. That is, a coefficient's neighborhood has a significant impact on its slack-range, and hence on its quantized value.

PERCEPTUAL MODEL. The following example perceptual model illustrates the flexibility afforded by the above-described modified quantization approach. It should be noted that perceptual model described herein has not been selected as an example of an optimal design, but as illustrating the limitations that constrain prior art perceptual model design—and how those constraints can be overcome with the present approach, thereby allowing almost completely arbitrary design of future perceptual models.

The model assigns slack ranges to wavelet coefficients of images and is a variation on the perceptual model implicit in the visual optimization tools provided in JPEG 2000. The wavelet transform used here is the 9-7 transform used in JPEG 2000. The number of times the transform is applied to the image depends on the original image size—it is applied enough times to reduce the LL band to 16×16 coefficients or smaller. Thus, for example, if the original image is 256×256, the system uses a four level transform. The model is controlled by a single parameter, q, which determines the amount by which the image may be distorted during quantization. When q=0, all coefficients are assigned slacks of 0, and no quantization takes place. As q increases, the slack ranges become progressively larger, and the image will be more heavily quantized. No attempt is made to perform sophisticated perceptual modeling for the final LL band of the transform. This band has dramatically different perceptual qualities from the other bands, which would require a different method of assigning slack ranges. However, as the band is small compared to the rest of the image, it is not really necessary to come up with such a method for our purposes here. Instead, each coefficient in this band is given a slack range obtained by $$x_{min}=x-\min(q,1)$$

$$x_{max}=x+\min(q,1)$$

where x is the original value of the coefficient and $x_{min}$ and $x_{max}$ give the slack range.

The method of assigning slack ranges for the remaining coefficients is described below as a succession of components. Each of the following describes a progressively more sophisticated aspect of the perceptual model.

Self masking. The model begins by replicating the JPEG 2000 tool of self-contrast masking. The idea behind this tool is that the amount by which a coefficient may be distorted increases with the coefficient's magnitude. This suggests the quantization scale should be non-linear. In JPEG~2000, the non-linear quantization scale is implemented by applying a non-linear function to each coefficient before linear quantization in the encoder:

$$x_1=x/C_{sb}$$

$$x_2=x_1^{\alpha}$$

$$x_q=\mathrm{round}(x_2)$$

where alpha is a predefined constant, usually 0.7, and $C_{sb}$ is a constant associated with the subband being quantized, based on the contrast sensitivity function of the human visual system. This process is inverted (except for the rounding operation) in the decoder:

$$\hat{x}_1 = x_q^{\frac{1}{\alpha}}$$

$$\hat{x} = C_{sb}\hat{x}_1.$$

To find a slack range based on this tool, we want to find $x_{min}$ and $x_{max}$ such that $x_{min}$<=xhat<=$x_{max}$. This will give us the range of values that the above coding and decoding process might produce, which, implicitly, is the range of values that should yield acceptable distortion. As the rounding operation might add or subtract up to 0.5 ($|x_2-x_q|<=0.5$), the range of possible values for xhat is given by $$x_{min} = (x^{\alpha} - 0.5\,C_{sb}^{\alpha})^{\frac{1}{\alpha}}$$

$$x_{max} = (x^{\alpha} + 0.5\,C_{sb}^{\alpha})^{\frac{1}{\alpha}}.$$

We can replace 0.5 $C_{sb}^{alpha}$ with a different constant, also indexed by subband, $Q_{sb}$. To control the amount of distortion, we'll multiply this latter constant by q. So the final mechanism for handling self contrast masking in the present perceptual model is $$x_{min} = (x^{\alpha} - qQ_{sb})^{\frac{1}{\alpha}}$$

$$x_{max} = (x^{\alpha} + qQ_{sb})^{\frac{1}{\alpha}}.$$

A minor problem arises when x or x^\alpha−q $Q_{sb}$ is less than zero, because this can lead to imaginary values of $x_{min}$. To solve this, one can simply clip the range at zero. If x>=0, then $$x_{min} = -(-x^{\alpha} + qQ_{sb})^{\frac{1}{\alpha}}$$

$$x_{max} = -\max(0,\,(-x^{\alpha} - qQ_{sb}))^{\frac{1}{\alpha}}$$

otherwise $$x_{min} = -(-x^{\alpha} + qQ_{sb})^{\frac{1}{\alpha}}$$

$$x_{max} = -\max(0,\,(-x^{\alpha} - qQ_{sb}))^{\frac{1}{\alpha}}$$

Figure 8:
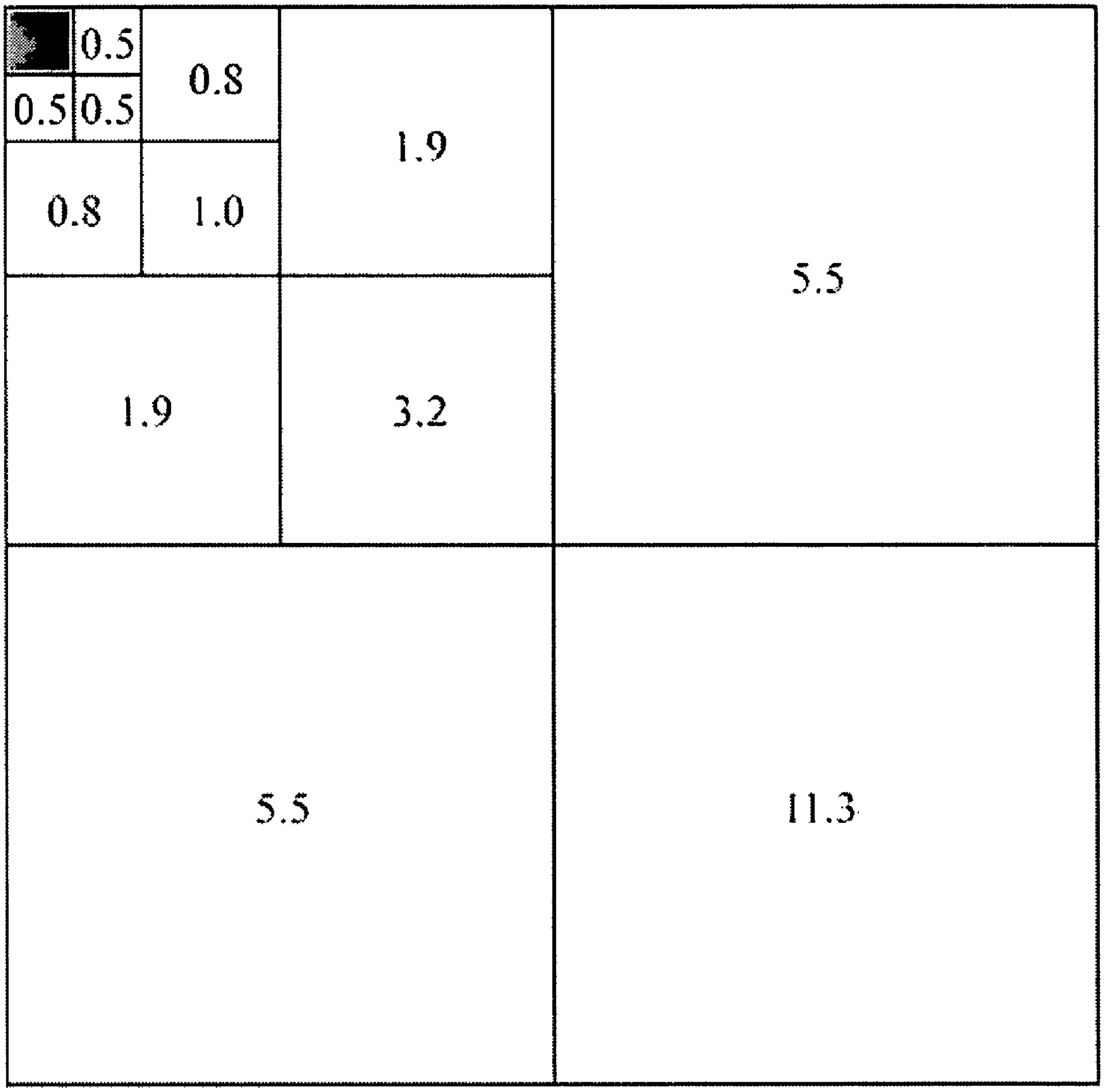
FIG. 8 is an illustration of $Q_{sb}$ values that can be used with the example perceptual model described herein.

FIG. 8 shows an example of values used for $Q_{sb}$. Each box corresponds to a subband of a 512×512 image. The gray box is the 16×16 LL band, for which $Q_{sb}$ is not used. The numbers show the values for $Q_{sb}$ in the other subbands.

Figure 9:
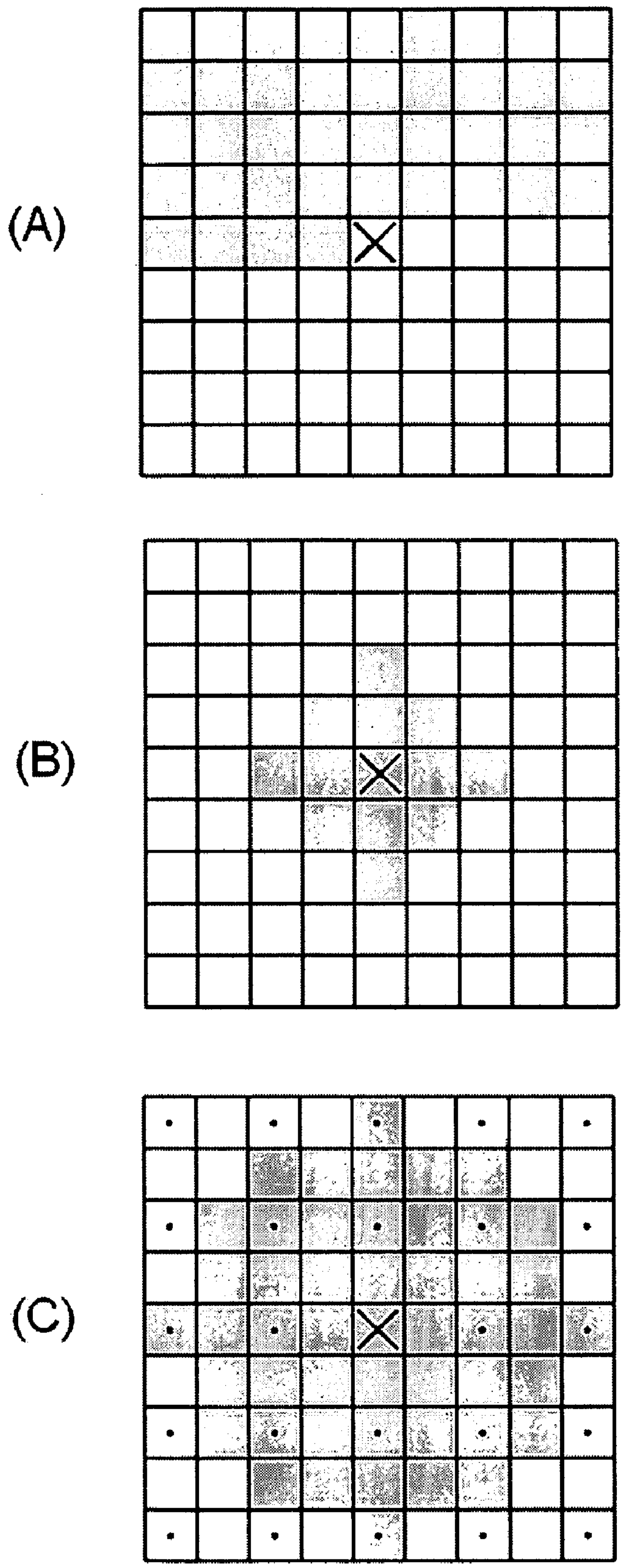
FIG. 9A illustrates examples of the coefficients that can be used for prior art point-wise extended masking.
FIGS. 9B and 9C in contrast illustrate the flexibility of neighborhood masking when used with an embodiment of the present invention.

Neighborhood masking. The next mechanism models the effect of a coefficient's local neighborhood on its slack range. If there is a lot of energy in the neighborhood, with the same frequency and orientation as the coefficient in question, then distortions will be less perceptible and the slack can be increased. This is handled in JPEG 2000 with what is called point-wise extended masking, wherein $x_2$ (see above) is adjusted according to a function of the coefficient values in the neighborhood. Thus $$n = 1 + \frac{a}{|N|}\sum_{i\in N}|x_{qi}|^{\beta}$$

$$x_1 = x/C_{sb}$$

$$x_2 = x_1^{\alpha}$$

$$x_3 = x_2/n$$

$$x_q = \mathrm{round}(x_3)$$

where a is a constant, N is the set of coefficient indices describing the neighborhood, |N| is the size of that set, $x_{qi}$ is the previously quantized value for coefficient i, and beta is a small constant. As with the self-masking tool described above, this process must be inverted at the decoder, which means that n must be computable at the decoder. This is made possible by computing n from the quantized coefficient values in the neighborhood, rather than their original values, and by limiting the neighborhood to coefficients appearing earlier in the scanning order, as illustrated by FIG. 9A. The scanning order is top-to-bottom, left-to-right, so the coefficients used for this calculation must be above or to the left of the current coefficient. Only these coefficients, marked by gray in FIG. 9A, can be used for prior art perceptual modeling when determining the quantization interval for the coefficient marked "x." Although these prior art limitations do not prevent point-wise extended masking from yielding significant improvements in perceptual quality, they probably do reduce its impact. By computing n from quantized values, there is probably a loss of some subtler variations in the masking ability of the image. And by limiting ourselves to the asymmetric neighborhood of FIG. 9A, this probably also introduces some undesirable artifacts—for example, the distortion applied to an image will be different if the image is encoded upside-down or right-side up, which implies that this is not the best distortion that can be achieved.

The above-described modified quantization approach removes the need for these prior art limitations. To illustrate this, FIG. 9B shows how a perceptual model can be designed that includes a mechanism for capturing neighborhood effects that uses the original, unquantized coefficient values and a symmetric neighborhood. To simplify implementation, the mechanism is slightly different from point-wise extended masking, but it is similar in spirit. The idea is to replace the magnitude of x with an Lp norm of the surrounding neighborhood, before computing $x_{min}$ and $x_{max}$:

$$x' = \left(k \sum_{i \in N} x_i^p\right)^{\frac{1}{p}}$$

where k and p are constants, and N describes the neighborhood. $x_{min}$ and $x_{max}$ are then computed from x' instead of x, as described above. FIG. 9B shows the coefficient values used for computing the neighborhood masking effects. The "x" indicates the coefficient for which slacks are being computed. The gray area indicates coefficients in the neighborhood set N. (Note that the coefficient whose slack is being calculated is included in this set in this example.)

Calculating slacks before subsampling. One of the problems with perceptual modeling for wavelet transforms is that each subband is subsampled at a rate lower than the Nyquist frequency. The information lost in this sampling is recovered in lower-frequency subbands. This means that, if we try to estimate the local energy of a given frequency and orientation by looking at the wavelet coefficients (as the above perceptual model does so far), then aliasing can severely distort the estimates. This problem can be reduced by simply calculating slacks before subsampling each subband. Each level of the forward wavelet transform can be implemented by applying four filters to the image—a low-pass filter (LL), a horizontal filter (LH), a vertical filter (HL), and a filter with energy along both diagonals (HH)—and then subsampling each of the four resulting filtered images. The next level is obtained by applying the same process recursively to the LL layer. Slacks can be computed, using the above models for self masking and neighborhood masking, after applying the filters but before subsampling. The slacks themselves are then subsampled along with the subbands.

FIG. 9C shows an illustration of the coefficient values that can be used for computing neighborhood masking effects before subsampling each subband. Again, the "x" indicates the coefficient for which slacks are being computed. The gray area indicates coefficients in the neighborhood set N. The dots indicate coefficients that will be kept after subsampling.

Figure 10:
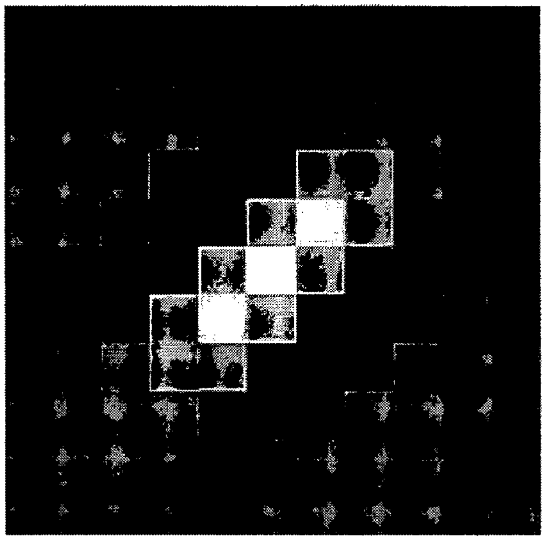
FIGS. 10A and 10B illustrate separated diagonal filters that can be used in the example perceptual model.
Figure 10:
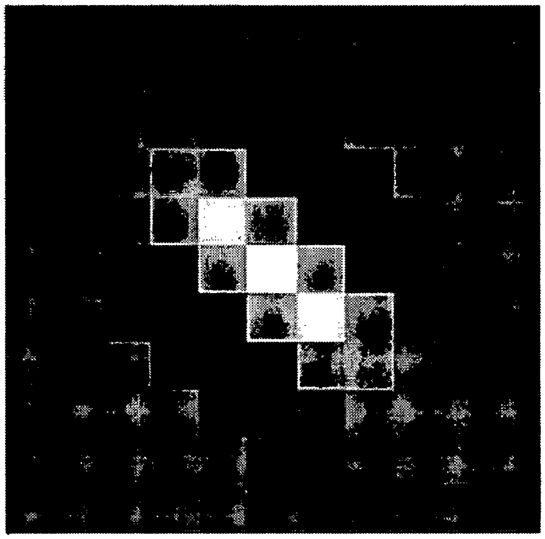

Separating orientations in the diagonal band. Another perennial problem with perceptual modeling for wavelet transforms is that the HH subband contains energy in both diagonal directions. This is a problem because the two directions are perceptually independent—energy in one direction does not mask noise in the other. A model that calculates slacks from the local energy in the HH subband, however, cannot distinguish between the two directions. A large amount of energy along one diagonal will translate into a high slack, allowing large distortions in the HH subband that will introduce noise in both directions. To solve this problem, we can compute two sets of slacks, using two single-diagonal filters, illustratively shown in FIGS. 10A and 10B. These filters sum to the wavelet transform's HH filter, but separate the two diagonal directions. When computing slack ranges, we replace the HH filter by these two filters, obtaining a total of 5 images per wavelet level (LL, LH, HL, diagonal 1, and diagonal 2). Slack ranges for each of these (except the LL subband) are computed as above. The slack range for each coefficient in the HH subband is then calculated as the lesser of the two corresponding diagonal slack ranges:

$$x_{min} = \max(x_{min}^{[1]}, x_{min}^{[2]})$$

$$x_{max} = \min(x_{max}^{[1]}, x_{max}^{[2]})$$

where $x_{min}^{[1]}$ and $x_{max}^{[1]}$ are the minimum and maximum values of the slack range computed for the first diagonal, and $x_{min}^{[2]}$ and $x_{max}^{[2]}$ are the slack range computed for the second diagonal. Basically, this says that the maximum amount a given HH coefficient may change is limited by the minimum masking available in the two diagonal directions.

Figure 11:
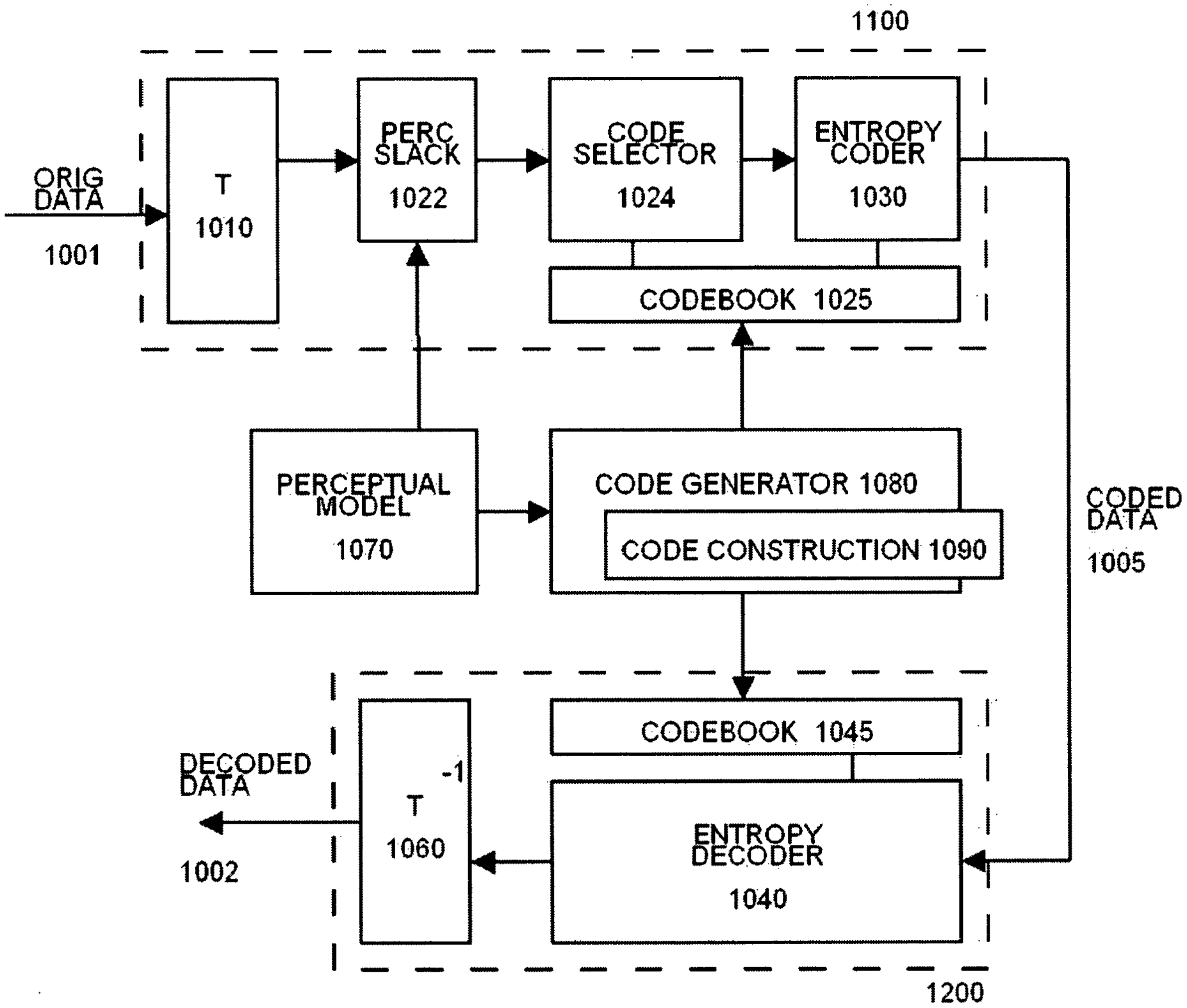
FIG. 11 is an illustration of a transform coding system, in accordance with an embodiment of the present invention.

EXAMPLE SYSTEM. FIG. 11 sets forth a block diagram of a transform coding system, illustrating how many of the techniques described above can be combined into a practical system. The input signal 1001 is encoded by an encoder 1100. The coded signal 1005 can then be decoded by a decoder 1200 to retrieve a copy of the original signal 1002.

The encoder 1100, as further described above, first applies a transform at 1010 to the input signal. The encoder 1100 then computes the perceptual slack at 1022 for the coefficients in the transformed signal in accordance with the specified perceptual model 1070, such as the model described above. Then, the encoder 1100 at 1024 selects code values from the codebook 1025 that lie within the perceptual slack for each of the coefficients. The encoder 1100 then applies an entropy coder 1030 using the selected code values. The decoder 1200 can decode the coded signal 1005 by simply using an entropy decoder 1040 and applying an inverse transform 1060 without any inverse quantization. As discussed above, it is preferable to utilize a codebook 1045 that has been optimally generated at 1080 for use with the system. The code generator 1080, in the context of generating appropriate codes for the encoder 1100 and decoder 1200, can utilize the approximation processing illustrated by FIG. 4 and a code construction scheme 1090 such as the modified Huffman code construction methodology discussed above and illustrated by FIG. 7.

It is also advantageous to incorporate techniques such as subband coding and zero tree coding in the system. Subband coding is basically the process of quantizing and coding each wavelet subband separately. In the context of the system in FIG. 11, a different entropy code can be used with different assumed distributions for each subband. The process of approximating an optimal probability distribution for the entropy code, illustrated by FIG. 4, can be carried out multiple times to generate different distributions from different corpora, each corpus obtained from a subband of a sample of different media. The encoder 1100 can compute all slacks and then try encoding each subband using each of the different codes. The encoder 1100 can then select the code for each subband that yields the best result and can insert a small identifier for this code into the coded signal 1005. For example, the inventor has used the above-described perceptual model and generated 37 different distributions from 37 different corpora, each corpus obtained from one subband of about 100 different images, with slacks calculated with one of 12 different values of q (except in the case of the LL subband, in which a single value of q=1 was used). 37 different Huffman codes were then constructed from these distributions, with each code word in each code representing a string of values, using the methodology illustrated in FIG. 7.

Figure 12:
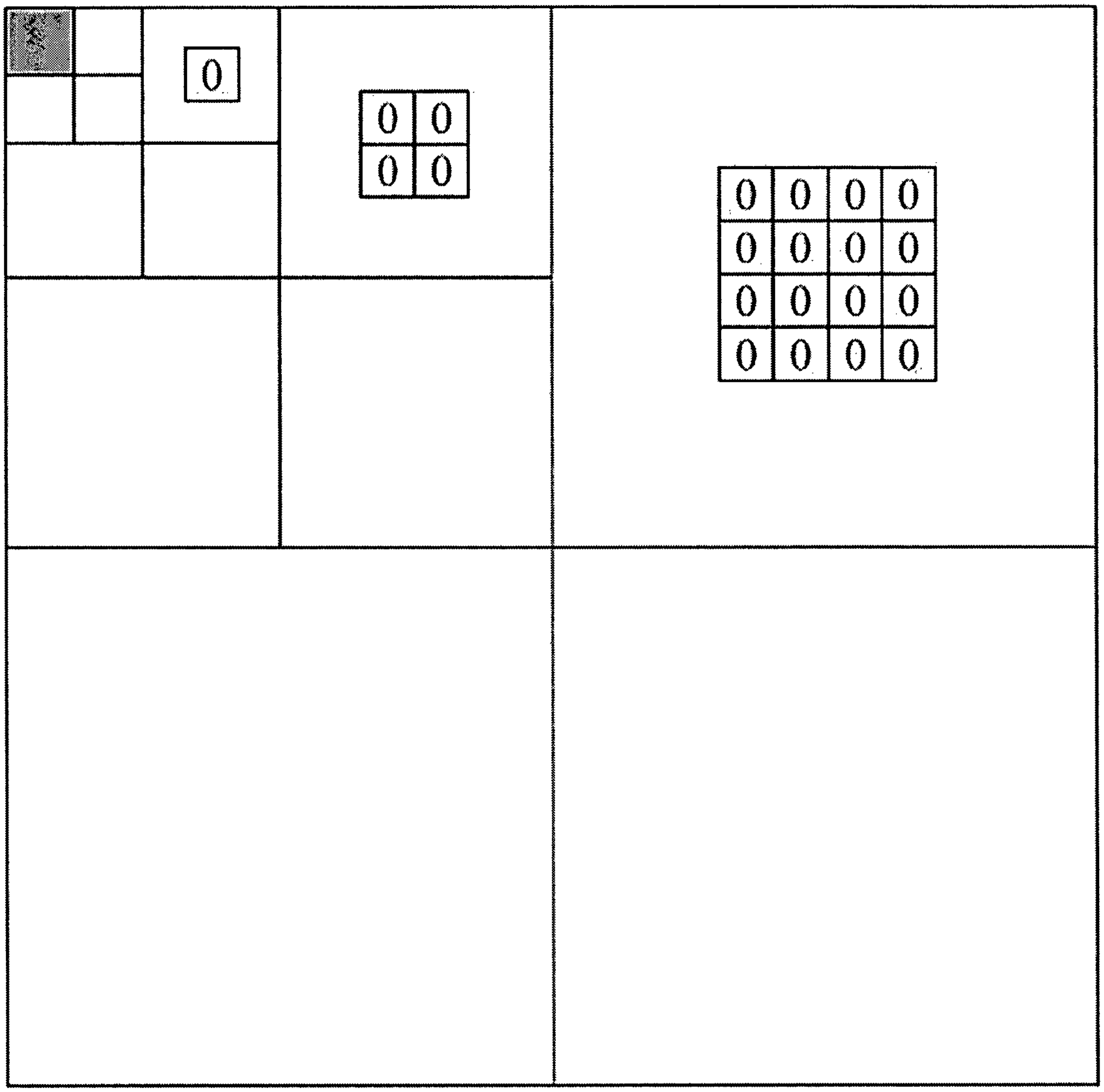
FIG. 12 illustrates an example of a zero tree, suitable for use with an embodiment of the present invention.

It is also advantageous to incorporate zero tree coding into the construction of the codes. Zero tree coding is a method of compacting quantized wavelet transforms. It is based on the observation that, when a wavelet coefficient can be quantized to zero, higher-frequency coefficients in the same orientation and basic location can also be quantized to zero. As a coefficient at one level corresponds spatially with four coefficients at the next lower (higher-frequency) level, coefficients can be organized into trees that cover small blocks of the image, and in many of these trees all the coefficients can be quantized to zero. Such trees are referred to in the art as "zero trees" and are illustrated by FIG. 12. All the 0's indicate coefficients that correspond in location and orientation, and that can be quantized to 0. Since zero trees are very common, it pays to encode them compactly. This can be done by replacing the root coefficient in a zero tree with a special symbol that means "this coefficient, and all higher-frequency coefficients in the same location, are 0." The higher-frequency coefficients then needn't be encoded. This idea can be readily incorporated into the system shown in FIG. 11 as follows. When the entropy codes are constricted at 1080, a preprocess can be applied to each media sample that finds zero trees (this means finding trees of coefficients that can all be quantized to zero, according to the perceptual model 1070). Only coefficients that are not part of these trees are then used in the corpora for generating the codes. Next, during compression at the encoder 1100, the same zero-tree-finding preprocess can be applied before applying the modified quantization approach to the remaining coefficients.

Figure 13:
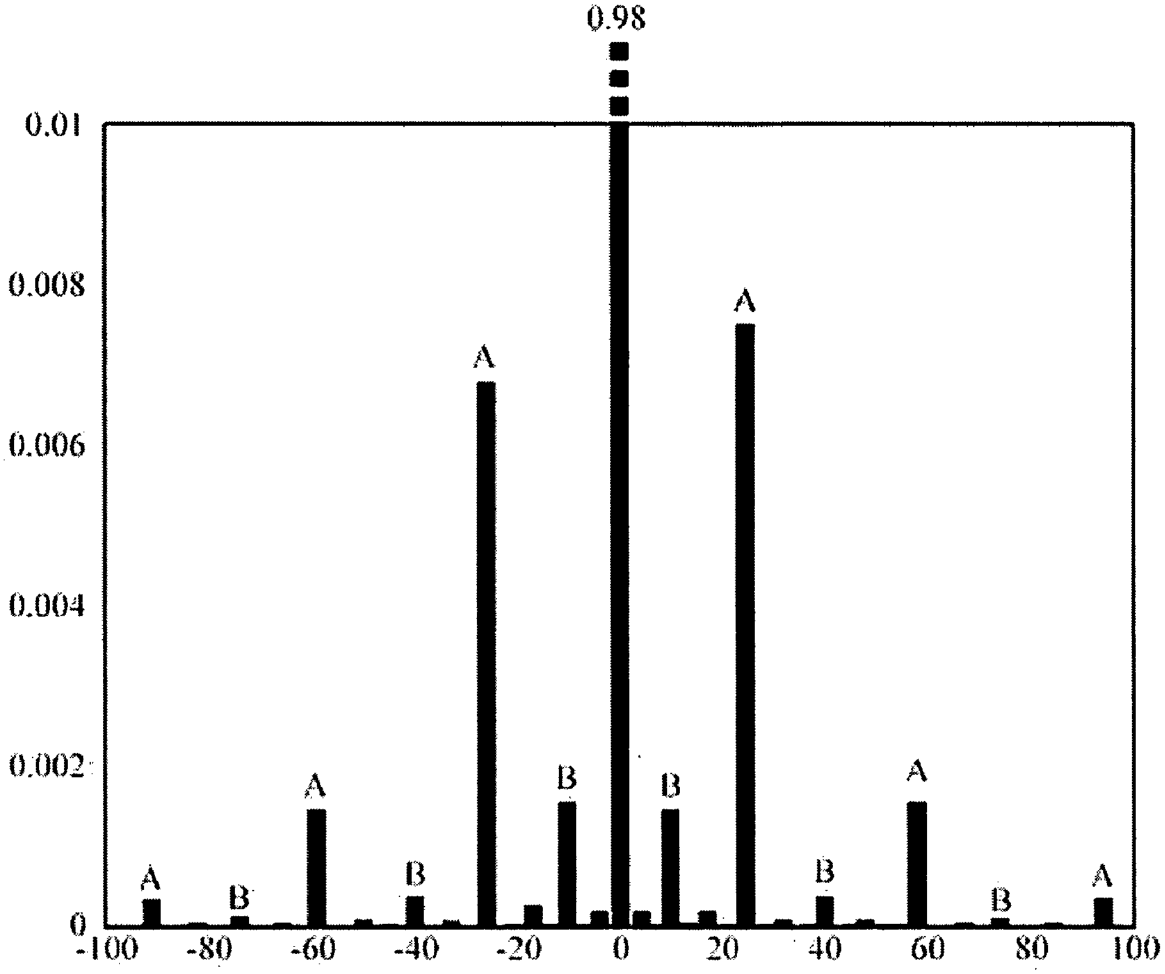
FIG. 13 shows the probability distribution obtained using LH, HL, and HH wavelet coefficients of a sample of images and slack ranges computed with the example perceptual model described herein.

FIG. 13 shows the probability distribution obtained from such an example transform coding system used with respect to images. The distributions were obtained using LH, HL, and HH wavelet coefficients from 100 images, with slack ranges computed using the perceptual model described above. It should be noted that the distribution in FIG. 13 is quite different from what would be obtained with more conventional approaches to transform coding. Conventional uniform or non-linear quantization would result in a histogram comprising widely-spaced bars whose heights drop off monotonically with magnitude (as in the histogram at the bottom of FIG. 3). The distribution in FIG. 13, however, comprises bars whose heights are non-monotonic with magnitude. The structure is of several, scaled and superimposed histograms, each of which would be obtained by applying non-linear quantization with distinct quantization intervals. That is, the bars labeled 'A' in FIG. 13 look like the result of a coarse non-linear quantization, and the bars labeled 'B' look like the result of a finer non-linear quantization, scaled to a smaller size than the 'A' bars. This makes sense. The majority of coefficients in the corpus are either close enough to an 'A' value, or have a large enough slack ranges, to be quantized to an 'A' value. Those few which cannot be quantized to an 'A' value must be quantized on a finer scale, and most of them are quantized to 'B' values. Smaller bars of the histogram pick up the few coefficients that cannot even reach an 'A' or a 'B'.

Scalable coding/decoding. Currently, there is much interest in arranging that a decoder can obtain images of different quality by decoding different subsets of the coded image. That is, if the decoder decodes the first $N_0$ bits, it should obtain a very rough approximation to the image; if it decodes the first $N_1>N_0$ bits, the approximation should be better; and so on. This is referred to in the art as scalable coding and decoding. The above modified quantization approach can be utilized to effectuate scalable coding/decoding. An image can be first quantized and encoded with very large perceptual slacks (e.g. a large value of q). Next, compute a narrower set of slack ranges (smaller value of q), but before using these slacks for the modified quantization, subtract the previously-quantized, lower-quality image from them. That is, for each coefficient, use $x_{min}-x_q0$ and $x_{max}-x_q0$ instead of $x_{min}$ and $x_{max}$, where $x_q0$ is the previous quantized value of the coefficient. Since $x_q0$ is likely close to the original value of the coefficient, x, the new slack ranges will be tightly grouped around zero, and can be highly compressed. To reconstruct the higher-quality layer upon decoding, it can be simply added to the decoded lower-quality layer.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents. As but one of many variations, it should be understood that transforms and entropy coders other than those specified above can be readily utilized in the context of the present invention.

What is claimed is:

1. A method of encoding an input signal with an encoder, the encoder configured to perform method steps comprising:

receiving the input signal;

obtaining a plurality of coefficients that represent the input signal;

for each coefficient, determining a range of perceptual slack values;

selecting a sequence of quantized values for the coefficients, each quantized value selected to lie within the range of perceptual slack values for one of the plurality of coefficients, wherein the sequence of quantized values is selected from a plurality of sequences and the selected sequence minimizes a size of a coded output signal;

performing encoding on the selected sequence of quantized values, thereby obtaining the coded output signal; and outputting the output signal, wherein the quantized values are selected from a pre-defined dictionary of quantized values, wherein the pre-defined dictionary of quantized values is in accordance with an entropy code and the encoding is performed by an entropy coder, and wherein the entropy code has a probability distribution determined by compiling a corpus of coefficient values along with corresponding ranges of perceptual slack values;

finding a quantized value to which a most number of coefficient values fall within the corresponding ranges of perceptual slack values, removing such coefficient values from the corpus, and setting a probability of the quantized value in the probability distribution to a frequency with which coefficient values can be quantized to the quantized value; and iterating with remaining coefficient values in the corpus until the corpus is empty.

2. The method of claim 1 wherein the range of perceptual slack values is determined so that the quantized values selected to lie within the range will produce perceptual distortion that is within a limit prescribed by a perceptual model.

3. The method of claim 1 wherein the entropy code is a Huffman code.

4. The method of claim 1 wherein the entropy code is a parameterized code.

5. The method of claim 1 wherein the entropy code is a context-dependent code.

6. The method of claim 1 wherein a previously-approximated value for each coefficient is subtracted from that coefficient's range of perceptual slack values before selection of the quantized values.

7. The method of claim 6 wherein the previously-approximated value is obtained from a lower-quality encoding of the input signal.

8. The method of claim 6 wherein the method is iterated to obtain progressively higher-quality encodings of the input signal.

9. The method of claim 1 wherein the coefficients are transform coefficients obtained by performing a transformation on the input signal.

10. The method of claim 1 wherein the coefficients are original samples of the input signal.

11. The method of claim 1 wherein the input signal comprises image data.

12. The method of claim 1 wherein the input signal comprises video data.

13. The method of claim 1 wherein the input signal comprises audio data.

14. An encoding system comprising:

a perceptual slack module which, for every coefficient of a plurality of coefficients obtained that represent an input signal, determines a range of perceptual slack values;

a code selector which selects a sequence of quantized values, each quantized value selected to lie within the range of perceptual slack values for one of the plurality of coefficients;

a pre-defined dictionary of quantized values that is in accordance with an entropy code, wherein the sequence of quantized values are selected from the pre-defined dictionary; and an entropy encoder which encodes the selected sequence of quantized values into a coded output signal, wherein the sequence of quantized values is selected from a plurality of sequences and the selected sequence minimizes a size of the coded output signal;

wherein the entropy code has a probability distribution determined by compiling a corpus of coefficient values along with corresponding ranges of perceptual slack values;

finding a quantized value to which a most number of coefficient values fall within the corresponding ranges of perceptual slack values, removing such coefficient values from the corpus, and setting a probability of the quantized value in the probability distribution to a frequency with which coefficient values can be quantized to the quantized value; and iterating with remaining coefficient values in the corpus until the corpus is empty.

15. The encoding system of claim 14 wherein the range of perceptual slack values is determined so that the quantized values selected to lie within the range will produce perceptual distortion that is within a limit prescribed by a perceptual model.

16. The encoding system of claim 14 wherein the entropy code is a Huffman code.

17. The encoding system of claim 14 wherein the entropy code is a parameterized code.

18. The encoding system of claim 14 wherein the entropy code is a context-dependent code.

19. The encoding system of claim 14 wherein a previously-approximated value for each coefficient is subtracted from that coefficient's range of perceptual slack values before selection of the quantized values.

20. The encoding system of claim 19 wherein the previously-approximated value is obtained from a lower-quality encoding of the input signal.

21. The encoding system of claim 19 wherein the encoding system iterates to obtain progressively higher-quality encodings of the input signal.

22. The encoding system of claim 14 wherein the coefficients are transform coefficients obtained by performing a transformation on the input signal.

23. The encoding system of claim 14 wherein the coefficients are original samples of the input signal.

24. The encoding system of claim 14 wherein the input signal comprises image data.

25. The encoding system of claim 14 wherein the input signal comprises video data.

26. The encoding system of claim 14 wherein the input signal comprises audio data.

* * * * *